UNITED STATES PATENT OFFICE.

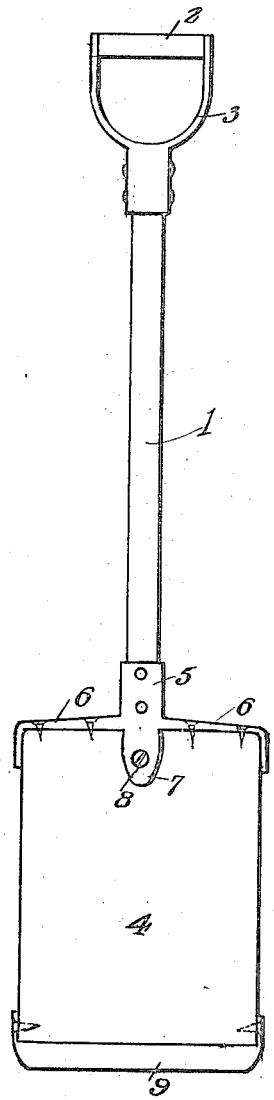

TELESPHOR PRENEVEAULT, OF INTERNATIONAL FALLS, MINNESOTA.

SHOVEL.

1,247,451. Specification of Letters Patent. Patented Nov. 20, 1917.

Application filed April 22, 1916. Serial No. 92,931.

*To all whom it may concern:*

Be it known that I, TELESPHOR PRENEVEAULT, a citizen of the United States, residing at International Falls, in the county of Koochiching and State of Minnesota, have invented certain new and useful Improvements in Shovels, of which the following is a specification.

The present invention relates to new and useful improvements in shovels, and has for its primary object the provision of a shovel which is simple, strong and durable in construction, said shovel having a body formed of wood or a similar material impregnated with a substance which prevents clay and other heavy earth from adhering to the blade of the shovel.

Another object of my invention is to provide a shovel of the class described having an improved mechanical construction which facilitates the use of wood or similar material in lieu of metal as a blade.

Another object of my invention is to provide a shovel of the class described, formed of wood and the like having the blade thereof impregnated with a composition which prevents adhering of clay and other heavy earth to the blade of the shovel.

Other objects and advantages to be derived from the use of my improved shovel will appear from the following detail description and the claims, taken with an inspection of the accompanying drawings, in which:

The figure shown is an elevational view of a shovel embodying the improvements of my invention.

Referring more particularly to the drawing, wherein similar characters of reference designate like corresponding parts 1 designates the handle portion of my improved shovel having a grip 2 carried by the upper end thereof. The grip 2 is carried in the usual bracket 3 which embraces the handle portion 1. The lower end of the handle 1 is connected with the blade 4 of the shovel by means of a bracket 5 embracing said handle 1, and having arms 6 extending laterally therefrom to engage the upper end of the blade 4. An enlargement 7 formed with the bracket 5 engages the blade, a screw 8 is passed therethrough to secure the bracket to the blade.

The blade of the shovel is preferably composed of a piece of wood or the like material capable of being impregnated with a compound hereinafter described. The lower marginal edge of the blade is provided with a cutting flange or edge 9 for an obvious purpose. The shovel shown in the drawing should be termed a spade in view of the fact that the blade thereof is of the straight type.

In order to eliminate the possibility of clay and other heavy earth adhering to the shovel blade, and also to provide a preservative therefor, the blade is subjected to a bath composed of kerosene and fish oil, there being equal parts of each constituent element. The blade is submerged in the liquid bath when the latter has reached the boiling point, and allowed to remain therein for at least twenty minutes. Of course, I do not limit myself to the actual time, but I find in practice that this produces the best results. While in the bath the wood becomes impregnated with the bath elements, and this treatment will prevent the adhering of clay and other heavy earth to the blade when the shovel is in use. I desire to call attention to the fact that I do not limit myself to the exact proportions mentioned concerning the impregnated compound, in view of the fact that under certain conditions it might be more advisable to vary the quantities of the constituent elements employed.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

What I claim as new and desire to secure by Letters Patent is:

1. An implement of the class described having an earth working element impregnated with a lubricating and preserving compound composed of kerosene oil and fish oil.

2. An implement of the class described having an earth working element impregnated with a lubricating and preserving compound composed of equal parts of kerosene oil and fish oil.

3. An implement of the class described having an earth working element of wood impregnated with a lubricating compound composed of equal parts of kerosene oil and fish oil.

In testimony whereof I affix my signature hereto.

TELESPHOR PRENEVEAULT.

Copies of this patent may be obtained for five cents each, by addressing the "Commissioner of Patents, Washington, D. C."